US009973292B2

(12) United States Patent
Aweya

(10) Patent No.: US 9,973,292 B2
(45) Date of Patent: May 15, 2018

(54) METHODS AND SYSTEMS FOR ESTIMATING OFFSET AND SKEW USING LINEAR PROGRAMMING

(71) Applicants: Khalifa University of Science, Technology and Research, Abu Dhabi (AE); British Telecommunications Plc, London (GB); Emirates Telecommunications Corporation, Abu Dhabi (AE)

(72) Inventor: James Aweya, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

(*) Notice: Subject to any disclaimer, the term of this patent is extended or adjusted under 35 U.S.C. 154(b) by 123 days.

(21) Appl. No.: 15/088,468

(22) Filed: Apr. 1, 2016

(65) Prior Publication Data

US 2017/0288801 A1    Oct. 5, 2017

(51) Int. Cl.
*H04J 3/06*   (2006.01)
*H04W 56/00*   (2009.01)
*H04L 7/04*   (2006.01)

(52) U.S. Cl.
CPC .............. *H04J 3/0661* (2013.01); *H04L 7/04* (2013.01); *H04W 56/001* (2013.01); *H04W 56/005* (2013.01)

(58) Field of Classification Search
CPC ....... H04J 3/0661; H04L 7/04; H04W 56/001; H04W 56/005
See application file for complete search history.

(56) References Cited

U.S. PATENT DOCUMENTS

| 2010/0329125 | A1 | 12/2010 | Roberts et al. |
| 2014/0064303 | A1* | 3/2014 | Aweya ................. H04J 3/0667 370/509 |
| 2016/0095075 | A1 | 3/2016 | Bin Sediq et al. |

OTHER PUBLICATIONS

"A Linear Programming Approach to Highly Precise Clock Synchronization Over a Packet Network," Renaud Sirdey et al, Quarterly Journal of the Belgian, French and Italian Operations Research Societies, Springer, Berlin, DE; vol. 6, No. 4, Oct. 30, 2007, pp. 393-401.

"Clock Synchronization of Wireless Sensor Networks," Yik-Chung Wu et al.; IEEE Signal Processing Magazine, IEEE Service Center, Piscataway, NJ, vol. 28, No. 1; Jan. 1, 2011, pp. 124-138.

(Continued)

*Primary Examiner* — Kiet Tang
(74) *Attorney, Agent, or Firm* — Calfee, Halter & Griswold, LLP

(57) ABSTRACT

This invention relates to methods and systems for estimating offset and skew using linear programming. Embodiments of the invention relate to methods and systems which apply linear programming principles to links with asymmetric transmission rates which are estimated from an exchange of timing messages (for example under IEEE 1588 PTP). Further embodiments provide for the estimation of clock offsets using linear programming techniques when the skew is known or estimated.

24 Claims, 6 Drawing Sheets

(56) References Cited

OTHER PUBLICATIONS

"Mitigation of Asymmetric Link Delays in IEEE 1588 Clock Synchronization Systems," Reinhard Exel, IEEE Communications Letters, IEEE Service Center, Piscataway, NJ; vol. 18, No. 3, Mar. 1, 2014.
International Search report and Written Opinion, PCT/EP2016/057282, dated Jul. 1, 2016.

* cited by examiner

METHODS AND SYSTEMS FOR ESTIMATING OFFSET AND SKEW USING LINEAR PROGRAMMING

FIELD OF THE INVENTION

The present invention relates to methods and systems for estimating offset and skew using linear programming. It is particular, but not exclusively, related to methods and systems which apply linear programming principles to links with asymmetric transmission rates which are estimated from an exchange of timing messages (for example under IEEE 1588 PTP).

BACKGROUND OF THE INVENTION

In addition to upgrading legacy networks and equipment, mobile service providers are also looking for ways to offload the spectrum through the rollout of high-bandwidth indoor and outdoor wireless networks. One approach for spectrum offload is the deployment of multiple small cells in the network. Small cells (which comprise femtocells, picocells, metrocells and microcells) are low-power wireless access points that operate within the licensed spectrum.

Used primarily in residential and enterprise business settings, small cells communicate with the carrier network through a broadband connection as shown in FIG. 1, allowing users to continue using their mobile devices without an interruption in connectivity. Small cells are ideally suited to deliver improved coverage, capacity and signal strength in these environments and offer a relatively seamless approach for carriers to deliver greater capacity and faster data speeds while offloading traffic from the spectrum.

By delivering service using small cells, the operator is ensuring that the user is closer to the transmitter and enjoying the best possible performance. Finally, small cells provide cost-effective base station design and deployment. When deployed in a residential area or home use situation, the operator no longer bears the cost of site acquisition, power or backhaul from the customer premise to the head-end or aggregation point.

Small cells require, in particular, an economical and, preferably, a readily available backhaul solution to serve the large number of small cells. They require access to the rest of the mobile infrastructure such as macro-cells, clock references and mobile network controllers. Leveraging the existing broadband (e.g., DSL, GPON) infrastructure to the customer premises (FIG. 1) for small cells backhaul conceivably can lead to lower access costs than traditional leased line services. DSL, for example, can be a high-performance and cost-effective solution for mobile backhaul. Benefits of DSL for mobile backhaul include:

Ubiquitous availability
Reuse of copper resources in the network
Simple installation and easy maintenance
Reduction in Operational Expenditure ("OpEx") and Capital Expenditure ("CapEx") compared with other alternatives DSL equipped with time synchronization has therefore become an appealing alternative for mobile backhaul.

Time Synchronization of Small Cells

Synchronization plays a crucial role in mobile backhaul networks. Time Division Duplexing (TDD) small cells require a phase difference of less than 3 μs between base stations of adjacent cells. This is normally achieved by ensuring that the base stations are synchronized to within ±1.5 μs. 4G/LTE-Advanced, in particular, requires even stricter clock distribution accuracy at all base stations to ensure support for new features like Coordinated Multi-Point (CoMP) operation, enhanced Inter-Cell Interference Coordination (eICIC), Carrier Aggregation, and Location Based Services (LBS). The accuracy required by each of these techniques has not yet been agreed by 3GPP.

Synchronization may be provided to small cells by distributing a time reference over the backhaul network to the small cells. IEEE 1588 Precision Time Protocol (PTP) [1] is now the industry accepted packet-based method/standard for distributing timing information from a master to enable the clocks of distributed systems to be synchronized with high precision (accuracies in the nanosecond levels). It is also designed for applications that cannot bear the cost of a GPS receiver plus antenna at each node, or for which GPS signals are inaccessible. Installing a GPS antenna on every cellular base station has consequences in terms of both CapEx and OpEx. It can also add more complexity to the initial installation process of the base station (additional antennas, wiring, receiver, technician time whenever the outdoor antenna requires maintenance, etc.).

The delivery of accurate synchronization to small cell base stations is one of the major challenges facing mobile network operators. One existing approach for bigger base stations like macrocells is to co-locate a GPS receiver and antenna at each base station. But this will not be economical for small cell networks, which most likely will see an exponential growth in the number of cell sites, each covering a relatively small slice of the area covered by a single macrocell base station. Moreover, small cell base stations are much smaller than macrocell base stations, and in many cases they will be unable to host a GPS receiver and antenna, either because there is no space or because there is no clear sky view to a GPS satellite, or both. Also, the issue is simply a matter of economics because purchasing, installing and maintaining a GPS receiver and antenna at every small cell base station will quickly become prohibitively expensive. Furthermore, small cells deployed in the indoor environment are unlikely to be able to acquire a GPS signal, due to the attenuation of the signal caused by the building in which they are housed, and will need to use a network-delivered reference. Hence, transferring timing via packet transport is a relevant synchronization technique that must coexist and interoperate with all others.

In addition to oscillator stability, the quality of the time synchronization depends heavily on how well the level of packet delay variations (PDVs), communication path asymmetries, and system noise between the clock source (master) and the receiver (slave) are mitigated. An additional source of communication path asymmetry (that exists in technologies such as DSL and GPON) is transmission rate asymmetry which occurs when the forward and reverse paths have different transmission rates resulting in a transmission delay asymmetry. Transmission delay asymmetry further complicates the problem of clock recovery at the end-user (slave).

Therefore, one of the main challenges in clock transfer over packet networks is dealing with the packet delay variation (PDV) and communication path asymmetries (i.e., asymmetry in forward and reverse path delays) in the network, which can present considerable error components in the recovered clock. These error components have to be adequately mitigated in order to obtain accurate clock performance. The communication path asymmetries can be due to one or more of: physical link (wire/fiber) asymmetries; internal device signal path and processing delay asymmetries (chip, board, and board-to-board level delays); and load (or queuing) induced asymmetries (which arise when the queuing delays in the forward and reverse paths are different).

An additional source of communication path asymmetry is transmission rate asymmetry which occurs when the forward and reverse paths have different transmission rates resulting in a transmission delay asymmetry. The transmission delay (which is inversely proportional to the transmission rate) is the amount of time it takes to put data on the transmission medium. The higher the transmission rate, the shorter the transmission delay.

Time transfer using a protocol such as IEEE 1588 PTP and a well-designed slave clock recovery mechanism can provide time synchronization in the sub-microsecond level and lower. However, this is usually done using the important assumption that the message transfer delay from master to slave is equal to that from slave to master. In real life, the communication paths are not perfectly symmetric, mainly due to dissimilar forward and reverse physical link delays, internal device delays, and queuing delays. Even in cases where the physical link and internal device delays are known and properly compensated for during clock synchronization, queuing delays which are variable can still exist when timing messages go through the packet network and queued for forwarding.

In some variants of DSL and GPON, for example, the inherent transmission rate asymmetry is additional source of delay asymmetry that needs to be properly addressed during clock synchronization.

Overview of IEEE 1588v2 PTP

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to (frequency or time) synchronize to the master clock. Synchronization information is distributed hierarchically, with a GrandMaster clock at the root of the hierarchy. The GrandMaster provides the time reference for one or more slave devices. These slave devices can, in turn, act as master devices for further hierarchical layers of slave devices. PTP provides a mechanism (i.e., Best Master Clock Algorithm) for slave clocks to select the best master clock in their respective synchronization domain. The selection is performed according to the PTP attributes of the GrandMaster (e.g. PTP priority, clock class).

The PTP message exchange process (i.e., the PTP Delay Request/Delay Response flow) between a master and a slave is performed as follows and as illustrated in FIG. 2. IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp). A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message.

FIG. 2 illustrates the basic pattern of synchronization message exchanges for the two-step clocks. The master 1 sends a Sync message to the slave 3 over the packet network 2 and notes the time $T_1$ at which it was sent according to the master clock 4. The slave 3 receives the Sync message and notes the time of reception $T_2$ according to the slave clock 5. The master 1 conveys to the slave the timestamp $T_1$ by one of two ways: 1) Embedding the timestamp $T_1$ in the Sync message (one-step clock—not shown). This requires some sort of hardware processing (i.e., hardware timestamping) for highest accuracy and precision. 2) Embedding the timestamp $T_1$ in a Follow_Up message (two-step clock—as shown in FIG. 2). Next, the slave 3 sends a Delay_Req message to the master 1 over the packet network 2 and notes the time $T_3$ at which it was sent according to the slave clock 5. The master 1 receives the Delay_Req message and notes the time of reception $T_4$ according to the master clock 3. The master 1 conveys to the slave 3 the timestamp $T_4$ by embedding it in a Delay_Resp message.

At the end of this PTP message exchange, the slave 3 possesses all four timestamps $\{T_1, T_2, T_3, T_4\}$. These timestamps may be used to compute the offset of the slave clock 5 with respect to the master clock 4 and the communication delay of messages between the two clocks. The computation of offset normally assumes that the master-to-slave and slave-to-master path delays are equal, i.e. a symmetrical communication path. Clock frequencies change over time, so periodic message exchanges are required. Because these clock variations change slowly, the period between message exchanges is typically on the order of milliseconds to seconds.

Linear Programming

A number of linear programming methods have been proposed for clock synchronization and network measurements [2][3][4][5][6]. All of these methods have been formulated on the assumption that the data transmission rates, that is, the downstream and upstream transmission rates, between the master and slave are equal (symmetric). Equivalently, this means the transmission delays between the two endpoints are equal. All other delays such as the propagation delays and queuing delays (which cause (PDVs)) in the two directions do not necessary need to be equal. However any asymmetry in the propagation delays has to be known and compensated for during clock synchronization.

Backhaul technologies such as DSL or GPON, are inherently asymmetrical in transmission rates, and thus will require some form of transmission rate asymmetry compensation (in addition to other existing path asymmetries) in order to deliver accurate time synchronization. Thus, if time synchronization has to be delivered over such backhaul networks with asymmetrical delay on upstream and downstream, the level of asymmetry has to be accurately identified and proper compensation must be applied to avoid a time offset at the packet slave clock.

The transmission rate asymmetry issue (in addition to other path asymmetries) in DSL and GPON makes the distribution of synchronization signals from a central Grand-Master (GM) located somewhere in the core network right to the small cells attached to the head-end or aggregation point (e.g., DSLAM) problematic. End-to-end (E2E) time transfer by itself even over communication paths with no transmission rate asymmetry issues is challenging. Adding transmission rate asymmetry in this E2E time transfer scenario makes the problem even much more challenging. For these reasons, a much more acceptable approach is to incorporate or collocate a boundary clock (BC) or GM at the headend or aggregation point (i.e., DSLAM) which most likely will be located in the exchange (see FIG. 1). A more advanced solution could even have the GM or BC incorporated into headend or aggregation point device and also equipped with a built-in GPS receiver.

An object of the present invention is to recover the master clock accurately at the slave in spite of the delays caused by the network connection. In particular it is an object of the present invention to take account of transmission asymmetry issues in the network to improve the accuracy of the clock recovery.

SUMMARY OF THE INVENTION

An exemplary embodiment of the invention provides a slave device connected to a master device having a master clock over a network, wherein the slave device includes a slave clock and a processor, and wherein the processor is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which includes in its constraints said timestamps along with variables relating to: the skew and offset of the slave clock compared to the master clock; and the relationship between the forward and reverse transmission speeds in the network between the master device and the slave device; solve the linear programming problem to derive an estimate of the skew and offset of the slave clock relative to the master clock; and synchronize the slave clock to the master clock based on the estimated skew and offset to produce a master time estimate.

A further exemplary embodiment of the invention provides a method of synchronizing the time and frequency of a slave clock in a slave device to a master clock in a master device which is connected to the slave device over a network, the method including the steps of: exchanging, between the master device and the slave device, timing messages and recording timestamps which are: the time of sending of timing messages from the master device according to the master clock; the time of receipt of said timing messages according to the slave clock; the time of sending of said timing messages according to the slave clock; and the time of receipt of said timing messages according to the master clock; formulating a linear programming problem which includes in its constraints said timestamps along with variables relating to: the skew and offset of the slave clock compared to the master clock; and the relationship between the forward and reverse transmission speeds in the network between the master device and the slave device; solving the linear programming problem to derive an estimate of the skew and offset of the slave clock relative to the master clock; and synchronizing the slave clock to the master clock based on the estimated skew and offset to produce a master time estimate.

A further exemplary embodiment of the invention provides a time and frequency synchronisation system for a network, the system including: a master device having a master clock; a slave device having a slave clock; and a network connecting the master and slave devices, wherein: the slave clock comprises a slave clock and a processor; and the processor is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which includes in its constraints said timestamps along with variables relating to: the skew and offset of the slave clock compared to the master clock; and the relationship between the forward and reverse transmission speeds in the network between the master device and the slave device; solve the linear programming problem to derive an estimate of the skew and offset of the slave clock relative to the master clock; and synchronize the slave clock to the master clock based on the estimated skew and offset to produce a master time estimate.

BRIEF DESCRIPTION OF THE DRAWINGS

Embodiments of the invention will now be described by way of example with reference to the accompanying drawings in which.

DETAILED DESCRIPTION

Figure 1:
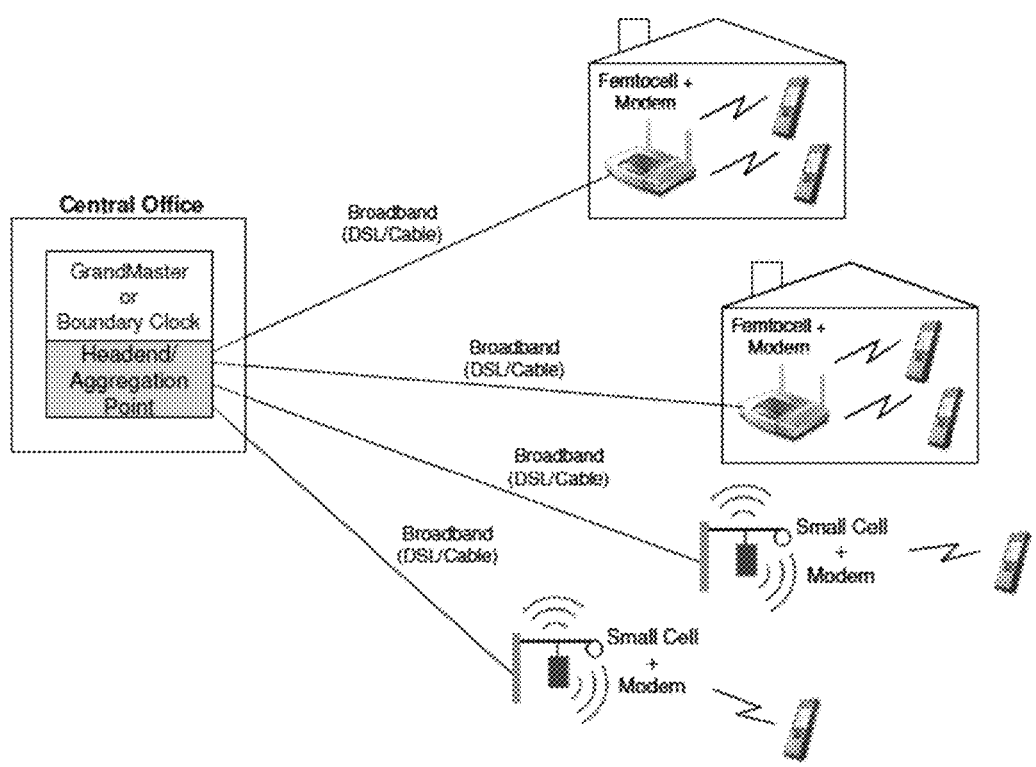
FIG. 1 shows the principles of time transfer over broadband connections to small cells and has already been described.

At their broadest, aspects of the present invention provide for methods and systems which are arranged to synchronize a slave clock in a slave device to a master clock by solving a linear programming problem which takes account of the asymmetry in the transmission rates between the master and slave devices to derive an estimate of the skew and offset of the slave clock relative to the master clock.

A first aspect of the present invention provides a slave device connected to a master device having a master clock over a network, wherein the slave device includes a slave clock and a processor, and wherein the processor is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which includes in its constraints said timestamps along with variables relating to: the skew and offset of the slave clock compared to the master clock; and the relationship between the forward and reverse transmission speeds in the network between the master device and the slave device; solve the linear programming problem to derive an estimate of the skew and offset of the slave clock relative to the master clock; and synchronize the slave clock to the master clock based on the estimated skew and offset to produce a master time estimate.

The network may be a packet network (using technologies such Ethernet, IP, MPLS, etc.).

The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The slave device of this aspect requires no assistance from the packet network in its synchronization operation and is still able to provide sub-microsecond level clock accuracies.

The slave device of this aspect uses a two-dimensional linear programming technique for estimating clock offset and skew from two-way timing message exchanges whilst taking account of transmission rate asymmetry (for example as may be found in DSL or GPON networks). It is assumed that the delay as a result of rate asymmetry could exist on top of other communication path delay asymmetries.

The proposed linear programming technique for estimating the clock offset and skew of a slave clock with respect to a master clock does not require knowledge of the measurement and process noise statistics as in Kalman filtering based techniques.

The master of this aspect may be a GrandMaster (GM) or a Boundary Clock (BC). BCs provide a means to distribute synchronization information in larger networks by building a clock hierarchy. The BC relieves the GM from handling a large number of ordinary clocks by segmenting downstream networks into areas.

In certain embodiments of the present aspect, the linear programming problem comprises two problems, in which: the first problem seeks to minimize the expression $$\frac{a}{2}(T_{2,1}^2 - T_{2,L}^2) + b_1(T_{2,1} - T_{2,L})$$

subject to the constraint that $aT_{2,n}+b_1 \leq \tau_n$, $n \in \{1,2,\ldots,L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n=T_{2,n}-T_{1,n}$ is the transport delay between the master and the slave with $T_{1,n}$ being the time of sending of the nth timing message from the master device according to the master clock, and the second problem seeks to minimize the expression $$\frac{a}{2}(T_{4,1}^2 - T_{4,L}^2) + b_2(T_{4,1} - T_{4,L})$$

subject to the constraint that $aT_{4,n}+b \leq \tau_n$, $n \in \{1,2,\ldots,L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau_n=T_{4,n}-T_{3,n}$ is the transport delay between the master and the slave with $T_{3,n}$ being the time of sending of the nth timing message from the slave device according to the slave clock.

In particular, the linear program may define $b_1$ as $b_1=-\theta+t_{ds}+p_{ds}$ and $b_2$ as $b_2=-\theta-\xi t_{ds}-p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

Having solved this linear program, the skew and offset of the slave clock can be determined.

In further embodiments of the present aspect the linear programming problem seeks to minimize the expression $\beta_1-\beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n} \geq (1+\alpha)T_{2,n}+\beta$, $T_{4,n} \leq (1+\alpha)T_{3,n}+\beta_2$ and $\beta_1-\beta_2 \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

In particular, the linear program may define $\beta_1$ as $\beta_1=\theta-t_{ds}-p_{ds}$ and $\beta_2$ as $\beta_2=\theta+\xi t_{ds}+p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

Solving this linear program provides a value for the skew and allows the offset to be determined.

In certain circumstances, the skew of the slave clock will be known from other methods, or can be estimated separately. In such cases, the terms involving the skew in the above linear programs become constants and so can be adjusted accordingly.

For example, if the skew is known, the two-problem program of the embodiments described above can be simplified to minimizing $b_1(T_{2,1}-T_{2,L})$ subject to the constraint that $b_1 \leq \tau_n-aT_{2,n}$, $n \in \{1,2,\ldots,L\}$ and minimizing $b_2(T_{4,1}-T_{4,L})$ subject to the constraint that $b_2 \leq \tau_n-aT_{4,n}$, $n \in \{1,2,\ldots,L\}$ in which a is now known/estimated in advance.

Similarly the single-problem program of the embodiments described above can be simplified as the constraints now contain only $\beta_1$ and $\beta_2$ as unknowns.

Further simplification may be possible if frequency synchronization can be achieved using a known technique (e.g. Synchronous Ethernet or Network Timing Reference), in which case the skew can be assumed to be zero (or approximately zero), thus further simplifying the linear program(s) to be solved.

Preferably the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

In some embodiments, the skew-adjusted free-running counter is also used to provide timestamps for the time of receipt and of sending of timing messages at/from the slave device.

In these embodiments the counter may be initialized on receipt by the slave device of the first timing message from the master device, and the counter may be reset on receipt of the first master time estimate to said first master time estimate.

The slave device of the present aspect may include any combination of some, all or none of the above described preferred and optional features.

The processor of the slave device of the above aspect preferably operates by performing a method according to the second aspect of this invention, as described below, but need not do so.

A second aspect of the present invention provides a method of synchronizing the time and frequency of a slave clock in a slave device to a master clock in a master device which is connected to the slave device over a network, the method including the steps of: exchanging, between the master device and the slave device, timing messages and recording timestamps which are: the time of sending of timing messages from the master device according to the master clock; the time of receipt of said timing messages according to the slave clock; the time of sending of said timing messages according to the slave clock; and the time of receipt of said timing messages according to the master clock; formulating a linear programming problem which includes in its constraints said timestamps along with variables relating to: the skew and offset of the slave clock compared to the master clock; and the relationship between the forward and reverse transmission speeds in the network between the master device and the slave device; solving the linear programming problem to derive an estimate of the skew and offset of the slave clock relative to the master clock; and synchronizing the slave clock to the master clock based on the estimated skew and offset to produce a master time estimate.

The network may be a packet network (using technologies such Ethernet, IP, MPLS, etc.).

The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The method of this aspect requires no assistance from the packet network in its synchronization operation and is still able to provide sub-microsecond level clock accuracies.

The method of this aspect uses a two-dimensional linear programming technique for estimating clock offset and skew from two-way timing message exchanges whilst taking account of transmission rate asymmetry (for example as may be found in DSL or GPON networks). It is assumed that the delay as a result of rate asymmetry could exist on top of other communication path delay asymmetries.

The proposed linear programming technique for estimating the clock offset and skew of a slave clock with respect to a master clock does not require knowledge of the measurement and process noise statistics as in Kalman filtering based techniques.

The master of this aspect may be a GrandMaster (GM) or a Boundary Clock (BC). BCs provide a means to distribute synchronization information in larger networks by building a clock hierarchy. The BC relieves the GM from handling a large number of ordinary clocks by segmenting downstream networks into areas.

In certain embodiments of the present aspect, the linear programming problem comprises two problems, in which: the first problem seeks to minimize the expression $$\frac{a}{2}(T_{2,1}^2 - T_{2,L}^2) + b_1(T_{2,1} - T_{2,L})$$

subject to the constraint that $aT_{2,n}+b_1 \leq \tau_n$, $n \in \{1,2,\ldots,L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n = T_{2,n} - T_{1,n}$ is the transport delay between the master and the slave with $T_{1,n}$ being the time of sending of the nth timing message from the master device according to the master clock, and the second problem seeks to minimize the expression $$\frac{a}{2}(T_{4,1}^2 - T_{4,L}^2) + b_2(T_{4,1} - T_{4,L})$$

subject to the constraint that $aT_{4,n}+b \leq \tau_n$, $n \in \{1,2,\ldots,L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau_n = T_{4,n} - T_{3,n}$ is the transport delay between the master and the slave with $T_{3,n}$ being the time of sending of the nth timing message from the slave device according to the slave clock.

In particular, the linear program may define $b_1$ as $b_1 = -\theta + t_{ds} + p_{ds}$ and $b_2$ as $b_2 = -\theta - \xi t_{ds} - p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and is the speed ratio of the transmission rate in the downstream direction to the transmission rate in the upstream direction.

Having solved this linear program, the skew and offset of the slave clock can be determined.

In further embodiments of the present aspect the linear programming problem seeks to minimize the expression $\beta_1 - \beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n} \geq (1+\alpha)T_{2,n}+\beta_1$, $T_{4,n} \leq (1+\alpha)T_{3,n}+\beta_2$ and $\beta_1 - \beta_2 \geq 0$ wherein: $\alpha$ is the skew of the slave clock compared to master clock; $T_{1,n}$ is the time of sending of the nth timing message from the master device according to the master clock; $T_{2,n}$n is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

In particular, the linear program may define $\beta_1$ as $\beta_1 = \theta - t_{ds} - p_{ds}$ and $\beta_2$ as $\beta_2 = \theta + \xi t_{ds} + p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

Solving this linear program provides a value for the skew and allows the offset to be determined.

In certain circumstances, the skew of the slave clock will be known from other methods, or can be estimated separately. In such cases, the terms involving the skew in the above linear programs become constants and so can be adjusted accordingly.

For example, if the skew is known, the two-problem program of the embodiments described above can be simplified to minimizing $b_1(T_{2,1} - T_{2,L})$ subject to the constraint that $b_1 \leq \tau_n - aT_{2,n}$, $n \in \{1,2, \ldots, L\}$ and minimizing $b_2(T_{4,1} - T_{4,L})$ subject to the constraint that $b_2 \leq \tau_n - aT_{4,n}$, $n \in \{1,2, \ldots, L\}$ in which a is now known/estimated in advance.

Similarly the single-problem program of the embodiments described above can be simplified as the constraints now contain only $\beta_1$ and) $\beta_2$ as unknowns.

Further simplification may be possible if frequency synchronization can be achieved using a known technique (e.g. Synchronous Ethernet or Network Timing Reference), in which case the skew can be assumed to be zero (or approximately zero), thus further simplifying the linear program(s) to be solved.

The slave clock may include a local free-running oscillator and a skew-adjusted free-running counter driven by the output of said local free-running oscillator, and the step of synchronizing may include the steps of: synchronizing the frequency of the slave clock to the frequency of the master clock by adjusting the skew-adjusted free-running counter to take account of the estimated skew and applying the estimated offset to the output of the skew-adjusted free-running counter to produce the master time estimate.

The skew-adjusted free-running counter may also be used to provide timestamps for the time of receipt and of sending of timing messages at/from the slave device.

The method may further include the steps of: initializing the counter on receipt by the slave device of the first timing message from the master device, and resetting the counter to said first master time estimate on receipt of the first master time estimate.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

A further embodiment of the present invention provides a time and frequency synchronisation system for a network, the system including: a master device having a master clock; a slave device having a slave clock; and a network connecting the master and slave devices, wherein: the slave clock comprises a slave clock and a processor; and the processor is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which includes in its constraints said timestamps along with variables relating to: the skew and offset of the slave clock compared to the master clock; and the relationship between the forward and reverse transmission speeds in the network between the master device and the slave device; solve the linear programming problem to derive an estimate of the skew and offset of the slave clock relative to the master clock; and synchronize the slave clock to the master clock based on the estimated skew and offset to produce a master time estimate.

The network may be a packet network (using technologies such Ethernet, IP, MPLS, etc.). The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The slave device of this aspect requires no assistance from the packet network in its synchronization operation and is still able to provide sub-microsecond level clock accuracies.

The slave device of this aspect uses a two-dimensional linear programming technique for estimating clock offset and skew from two-way timing message exchanges whilst taking account of transmission rate asymmetry (for example as may be found in DSL or GPON networks). It is assumed that the delay as a result of rate asymmetry could exist on top of other communication path delay asymmetries.

The proposed linear programming technique for estimating the clock offset and skew of a slave clock with respect to a master clock does not require knowledge of the measurement and process noise statistics as in Kalman filtering based techniques.

The master of this aspect may be a GrandMaster (GM) or a Boundary Clock (BC). BCs provide a means to distribute synchronization information in larger networks by building a clock hierarchy. The BC relieves the GM from handling a large number of ordinary clocks by segmenting downstream networks into areas.

In certain embodiments of the present aspect, the linear programming problem comprises two problems, in which: the first problem seeks to minimize the expression $$\frac{a}{2}(T_{2,1}^2 - T_{2,L}^2) + b_1(T_{2,1} - T_{2,L})$$

subject to the constraint that $aT_{2,n} + b_1 \leq \tau_n$, $n \in \{1,2, \ldots, L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n = T_{2,n} - T_{1,n}$ is the transport delay between the master and the slave with $T_{1,n}$ being the time of sending of the nth timing message from the master device according to the master clock, and the second problem seeks to minimize the expression $$\frac{a}{2}(T_{4,1}^2 - T_{4,L}^2) + b_2(T_{4,1} - T_{4,L})$$

subject to the constraint that $aT_{4,n}+b\leq\tau_n$, $n\in\{1,2,\ldots,L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau_n=T_{4,n}-T_{3,n}$ is the transport delay between the master and the slave with $T_{3,n}$ being the time of sending of the nth timing message from the slave device according to the slave clock.

In particular, the linear program may define $b_1$ as $b_1=-\theta+t_{ds}+p_{ds}$ and $b_2$ as $b_2=-\theta-\xi t_{ds}-p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

Having solved this linear program, the skew and offset of the slave clock can be determined.

In further embodiments of the present aspect the linear programming problem seeks to minimize the expression $\beta_1-\beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n}\geq(1+\alpha)T_{2,n}+\beta_1$, $T_{4,n}\leq(1+\alpha)T_{3,n}+\beta_2$ and $\beta_1-\beta_2\geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

In particular, the linear program may define $\beta_1$ as $\beta_1=\theta-t_{ds}-p_{ds}$ and $\beta_2$ as $\beta_2=\theta+\xi t_{ds}+p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

Solving this linear program provides a value for the skew and allows the offset to be determined.

In certain circumstances, the skew of the slave clock will be known from other methods, or can be estimated separately. In such cases, the terms involving the skew in the above linear programs become constants and so can be adjusted accordingly.

For example, if the skew is known, the two-problem program of the embodiments described above can be simplified to minimizing $b_1(T_{2,1}-T_{2,L})$ subject to the constraint that $b_1\leq\tau_n-aT_{2,n}$, $n\in\{1,2,\ldots,L\}$ and minimizing $b_2$ $(T_{4,1}-T_{4,L})$ subject to the constraint that $b_2\leq\tau_n-aT_{4,n}$, $n\in\{1, 2,\ldots,L\}$ in which a is now known/estimated in advance.

Similarly the single-problem program of the embodiments described above can be simplified as the constraints now contain only $\beta_1$ and $\beta_2$ as unknowns.

Further simplification may be possible if frequency synchronization can be achieved using a known technique (e.g. Synchronous Ethernet or Network Timing Reference), in which case the skew can be assumed to be zero (or approximately zero), thus further simplifying the linear program(s) to be solved.

Preferably the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

In some embodiments, the skew-adjusted free-running counter is also used to provide timestamps for the time of receipt and of sending of timing messages at/from the slave device.

In these embodiments the counter may be initialized on receipt by the slave device of the first timing message from the master device, and the counter may be reset on receipt of the first master time estimate to said first master time estimate.

The system of the present aspect may include any combination of some, all or none of the above described preferred and optional features.

The processor of the slave device of the above aspect preferably operates by performing a method according to the second aspect of this invention, as described above, but need not do so.

Proposed Synchronization Solutions

Figure 3:
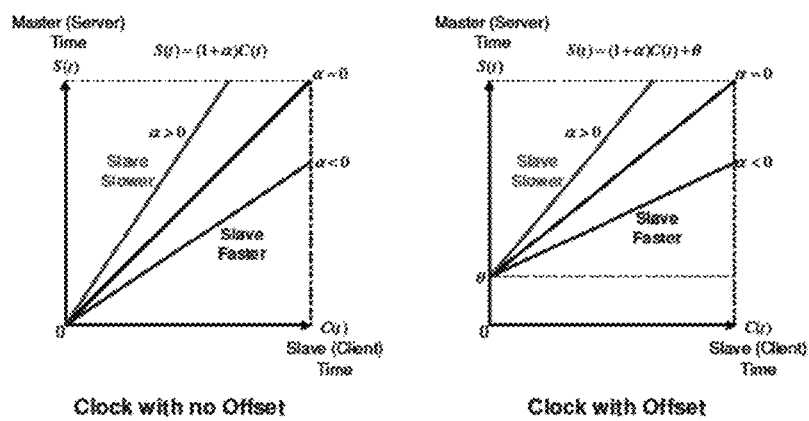
FIG. 3 shows two clock models for a clock with no offset (left) and a clock with offset (right)

First a generalized clock offset and skew equation is defined for the synchronization problem. It is assumed that, at any particular time instant, the instantaneous view of the relationship between the master (server) clock with timeline S(t) and the slave (client) clock with timeline C(t), can be described by the well-known simple skew clock model depicted in FIG. 3, and described by the equation, $$S(t)=(1+\alpha)C(t)+\theta, \quad (1)$$

where $\theta$ is the initial time offset and $\alpha$ is the skew (frequency offset) which is a very small quantity in the order of parts-per-million. This snapshot is an instantaneous view of how well the two clocks are (mis)aligned. FIG. 3 illustrates the influence of $\theta$ and $\alpha$ on the alignment.

Equation (1) can further be expressed as $$S(t)-C(t)=\theta_{tot}(t)=\alpha C(t)+\theta,$$

where $\theta_{tot}(t)=\alpha C(t)+\theta$ is the total time offset at any particular time t>0. This time varying offset which reflects the true offset between the two clocks consists of two components, one being $\theta$ the (fixed) initial offset, and the other $\alpha C(t)$ which is an offset that arises as a result of the non-zero skew between the two clocks. Time synchronization in this sense will require knowing accurately the total offset $\theta_{tot}(t)$ or, equivalently, its constituent components $\alpha$ and $\theta$, when given any C(t) value.

Considering the network configuration in FIG. 1, it is assumed that synchronization messages (see FIG. 2) are being exchanged between a master 1 in the headend/aggregation point and a slave 3 at the modem/access point end. The above equation can be extended to account for the case where the master clock 4 and slave clock 5 exchange messages over a communication link with delay. It can be assumed the nth Sync message traveling from the master to the slave (downstream direction) experiences a transmission delay of $t_{ds}$, a fixed physical link (or propagation) delay of $p_{ds}$, plus a random delay $w_{ds}$ which is due to DSL/GPON line noise and other artifacts.

Similarly, the nth Delay_Req message sent from the slave to the master (upstream direction) is assumed to experience a transmission delay of $t_{us}$, a fixed propagation delay of $p_{us}$ plus a random delay of $w_{us}$. It should be noted that the downstream and upstream end-to-end signal transmission delays of a DSL link are different. It is observed that a DSL link contains the following processing sources that can generate packet "jitters" or line perturbations in the order of a few hundreds of microseconds:

Forward error correction (FEC) encoder/decoder
mapping onto discrete multi-tone (DMT) modulation symbols
symbol transmission/reception
insertion of DSL sync symbols
transmitting user data to higher layer In addition, the DSL transceiver consists of digital part and analog part, which result in asymmetrical downstream and upstream end-to-end delays and delay jitters. The delays $w_{ds}$ and $w_{us}$ are considered to be the packet jitter in the DSL network.

An asymmetric path exists when the delay components in the two directions are unequal. It is assumed that the physical link delay (which can consist of wire/fiber delays, and internal device signal path and processing delays (i.e., chip, board, and board-to-board level delays)) is manually calibrated (as described in ITU-T Rec. G.8271 [7]) or known through other means. Current industry practices (see ITU-T Rec. G.8271) involve manual calibration of all of these types of delays.

Figure 4:
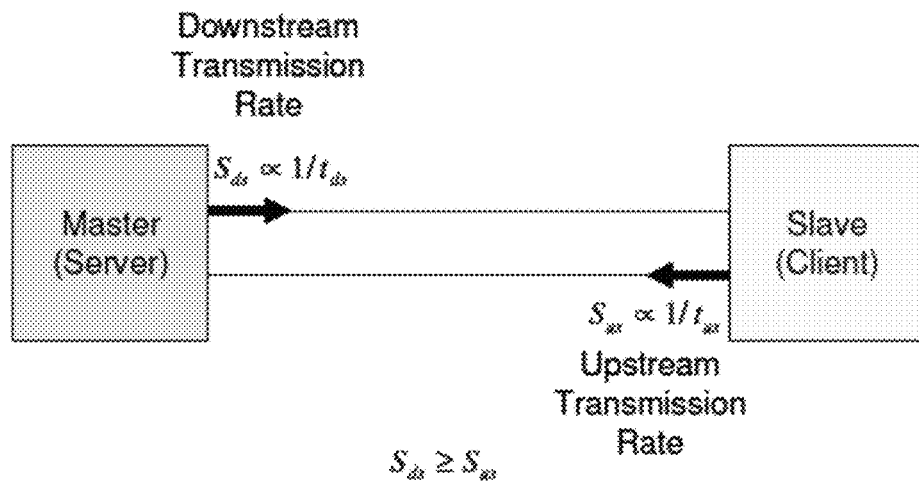
FIG. 4 illustrates the principles of link transmission rate asymmetry.

The transmission delay, on the other hand, is inversely proportional to the transmission rate (speed). The master to slave (downstream direction) transmission rate can be defined as $S_{ds} \propto 1/t_{ds}$ and the slave to master (upstream direction) transmission rate as $S_{us} \propto 1/t_{us}$ as shown in FIG. 4. From this the following speed relationship can be derived:

$$\frac{S_{ds}}{S_{us}} = \frac{t_{us}}{t_{ds}} = \xi, \qquad (2)$$

where $\xi > 0$ is a multiplicative factor (which we call a speed ratio) that relates $t_{ds}$ and $t_{us}$. The speed ratio $\xi$ can easily be computed if the downstream speed $S_{ds}$ and upstream speed $S_{us}$ are known or can be estimated. These speeds are the transmission speeds of PTP messages on the communication medium linking the master and slave clocks.

Figure 2:
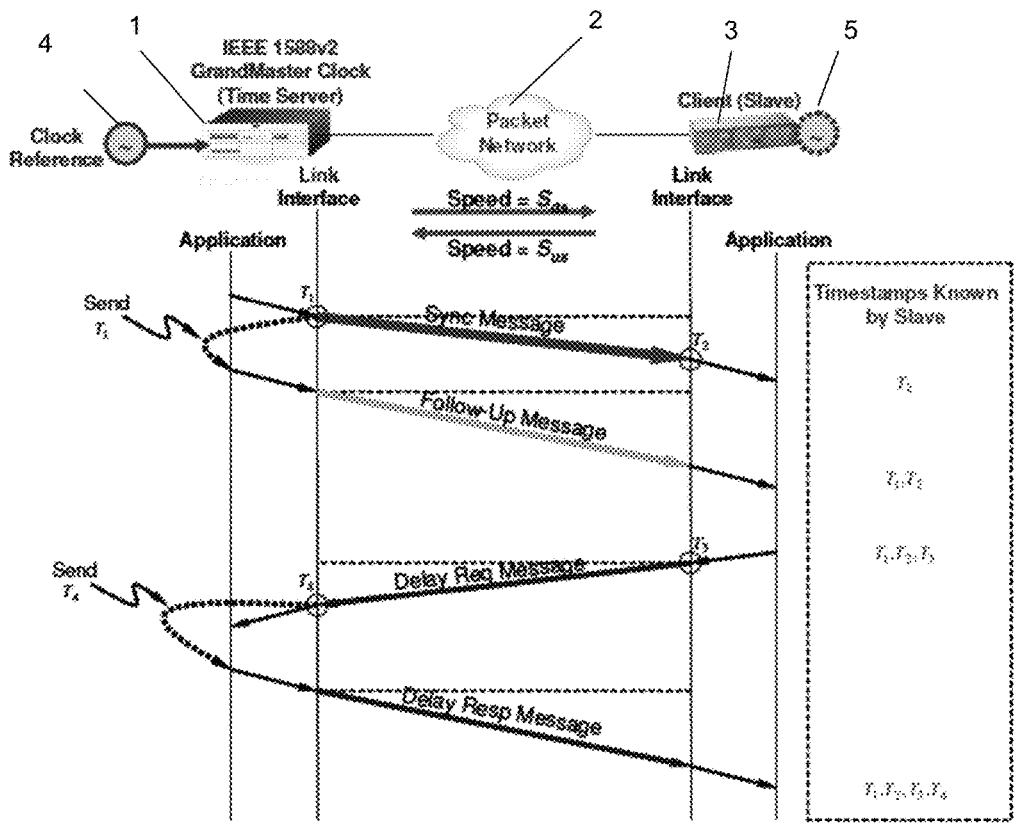
FIG. 2 shows the message flow in a two-step clock according to the IEEE 1588 PTP and has already been described.

The master and slave exchange messages using the delay-request delay-response mechanism described in FIG. 2. For the nth Sync message which departs the master with timestamp $T_{1,n} \in S(t)$ and arrives at the slave with timestamp $T_{2,n} \in C(t)$ after having experienced delays of $t_{ds}$, $p_{ds}$ and $w_{ds}$, the simple skew clock model above can be extended to account for the travel time to obtain the following expression:

$$(T_{1,n}+t_{ds}+p_{ds}+w_{ds})=(1+\alpha)T_{2,n}+\theta \qquad (3)$$

From (3), the following expressions can be derived $$(T_{1,n}+t_{ds}+p_{ds}) \le (1+\alpha)T_{2,n}+\theta \qquad (4)$$

$$T_{1,n} \le (1+\alpha)T_{2,n}+\theta-t_{ds}-p_{ds} \qquad (5)$$

A key assumption here is that the message exchanges occur over a period of time so small that the offset $\theta_{tot}$ and skew $\alpha$ can be assumed constant over that period. The effects of the initial offset and skew on the master-slave clock alignment are illustrated in FIG. 3.

For the nth Delay_Req message which departs the slave with timestamp $T_{3,n} \in C(t)$ and arrives at the master with timestamp $T_{4,n} \in S(t)$ after having experienced delays of $t_{us}=\xi t_{ds}$, $p_{us}$ and $w_{us}$, the following expression is obtained:

$$(T_{4,n}-t_{us}-p_{us}-w_{us})=(1+\alpha)T_{3,n}+\theta \qquad (6)$$

From (6), the following expressions can be obtained $$(T_{4,n}-t_{us}-p_{us}) \ge (1+\alpha)T_{3,n}+\theta \qquad (7)$$

$$T_{4,n} \ge (1+\alpha)T_{3,n}+\theta+\xi t_{ds}+p_{us} \qquad (8)$$

From (5), it is known that $$T_{1,n} \le (1+\in_1)T_{2,n}+\beta_1 \qquad (9)$$

where $$\varphi_1 = \alpha \qquad (10)$$

$$\beta_1 = \theta-t_{ds}-p_{ds} \qquad (11)$$

From (8), we can write $$T_{4,n} \ge (1+\varphi_2)T_{3,n}+\beta_2 \qquad (12)$$

where $$\varphi_2 = \alpha \qquad (13)$$

$$\beta_2 = \theta+\xi t_{ds}+p_{us} \qquad (14)$$

Adding (10) and (13), the skew is obtained as $$\alpha = \frac{\varphi_1 + \varphi_2}{2} \qquad (15)$$

Then adding (11) and (14), the clock offset is obtained as $$\beta_1 + \beta_2 = 2\theta + (\xi - 1)t_{ds} + (p_{us} - p_{ds}) \qquad (16)$$

$$\theta = \frac{\beta_1 + \beta_2}{2} + (1 - \xi)\frac{t_{ds}}{2} + \frac{(p_{ds} - p_{us})}{2} \qquad (17)$$

The link delays can be symmetric (i.e., $p_{ds}-p_{us}=0$) or the level of link delay asymmetry $p_{ds}-p_{us} \ne 0$ has to be accurately known and used in (17). For symmetric links, we have $$\theta = \frac{\beta_1 + \beta_2}{2} + (1 - \xi)\frac{t_{ds}}{2} \qquad (18)$$

When both the physical links and the transmission rates are symmetric (i.e., $p_{ds}-p_{us}=0$ and $\xi=1$), then (17) and (18) simplify to the classic clock synchronization solution (where symmetry is usually assumed):

$$\theta = \frac{\beta_1 + \beta_2}{2} \qquad (19)$$

The downstream transmission delay $t_{ds}$ can be estimated using a number of methods some of which are as follows:

Use the downstream transmission rate $S_{ds}$ and the Sync (or Delay_Req) message size $P_{sync}$ at the slave to estimate $t_{ds}$. Note that PTP Sync and Delay_Req messages have the same size:

$$t_{ds} = \frac{P_{sync}}{S_{ds}} \qquad (20)$$

Use the time it takes to receive a Sync message at the slave measured using the slave clock C(t) and the skew α to estimate $t_{ds}$. If $T_{first}$ and $T_{last}$ denote the receive timestamps (times) of the first and last bits of the message, respectively, then $$t_{ds} = (1+\alpha)(T_{last} - T_{first}) \qquad (21)$$

The implementation complexity of each method will play a big role in which method to use. The $t_{ds}$ obtained via any of the above two methods can be filtered before use in the computation of the clock offset θ. Below two linear programming models for computing the offset θ and skew α according to embodiments of the invention are described.

Linear Programming Model 1

A linear programming model for computing $\varphi_1$, $\beta_1$, $\varphi_2$, and $\beta_2$ according to a first embodiment of the present invention will now be described. First the exchange of Sync messages between master and slave is considered. Given the timestamps $T_{1,n}$ and $T_{2,n}$, let $\tau_n = T_{2,n} - T_{1,n}$ denote the transport delay between master and slave. If it is assumed that there is a cloud of $\tau_n$ points with corresponding $T_{2,n}$ points maintained at the slave, then the objective is to find a line below the cloud of points with $T_2$ in abscissa (x-axis) and τ in ordinate (y-axis). The slope of the line gives an estimate of the skew $\varphi_1$.

From (9), $$-\varphi_1 T_{2,n} - \beta_1 \leq T_{2,n} - T_{1,n}$$

$$-\varphi_1 T_{2,n} - \beta_1 \leq \tau_n \qquad (22)$$

Let $a = -\varphi_1$ and $b = -\beta_1$. Then (22) is of form $$ax + b \leq y, \qquad (23)$$

where $x = T_{2,n}$ and $y = \tau_n$. The line bordering the cloud of points is $$ax + b = y \qquad (24)$$

Figure 5:
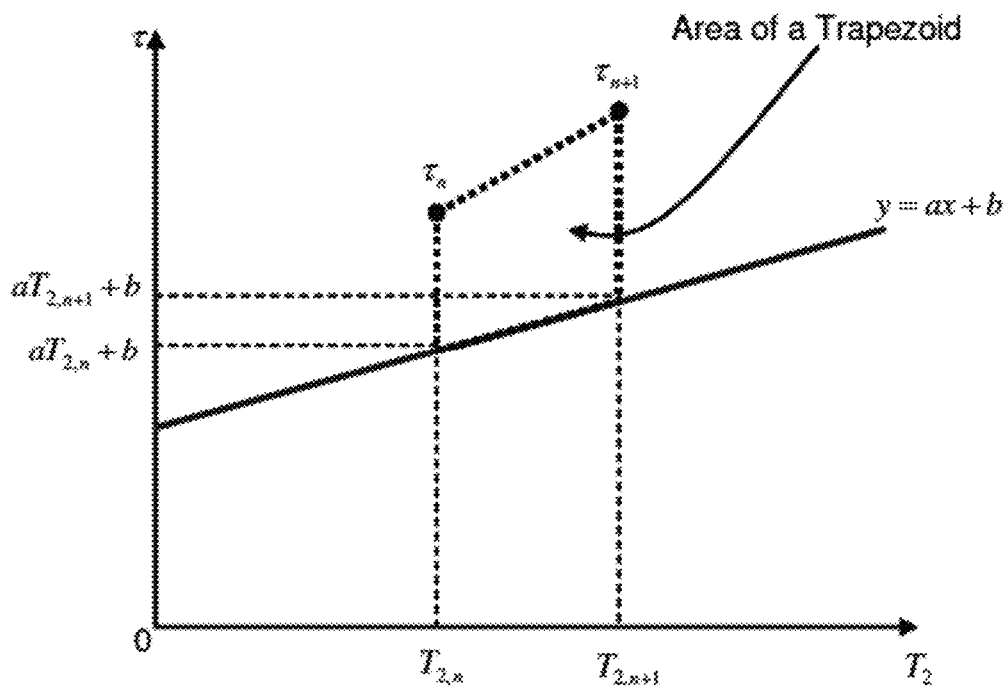
FIG. 5 is a graphical representation of the objective function according to an embodiment of the present invention.

The unknowns in (24) are $a = -\varphi_1$ and $b = -\beta_1$. Since the line (24) must lie below the cloud, the linear constraint $aT_{2,n} + b \leq \tau_n$ must be satisfied for all n. A possible objective function may then consist of minimizing the area between the cloud and the line as illustrated in FIG. 5.

Let L>1 denote the number of Sync message exchanges between master and slave over a defined period of time (i.e., the sampling or measurement period). From FIG. 5, the objective function can be expressed as $$f(a, b) = \frac{1}{2}\sum_{n=1}^{L-1} [(\tau_n - aT_{2,n} - b) + (\tau_{n+1} - aT_{2,n+1} - b)](T_{2,n+1} - T_{2,n}) \qquad (25)$$

$$= \lambda - \frac{a}{2}\sum_{n=1}^{L-1}(T_{2,n+1} + T_{2,n})(T_{2,n+1} - T_{2,n}) - b\sum_{n=1}^{L-1}(T_{2,n+1} - T_{2,n})$$

$$= \lambda - \frac{a}{2}\sum_{n=1}^{L-1}(T_{2,n+1}^2 - T_{2,n}^2) - b\sum_{n=1}^{L-1}(T_{2,n+1} - T_{2,n})$$

$$= \lambda - \frac{a}{2}(T_{2,L}^2 - T_{2,1}^2) - b(T_{2,L} - T_{2,1})$$

$$= \lambda + \frac{a}{2}(T_{2,1}^2 - T_{2,L}^2) + b(T_{2,1} - T_{2,L})$$

-continued $$\lambda = \frac{1}{2}\sum_{n=1}^{L-1}(\tau_n + \tau_{n+1})(T_{2,n+1} - T_{2,n}), \qquad (26)$$

is a quantity that is not dependent on a and/or b. From the above discussion, the following two-dimensional or two-variable linear program can be formulated:

$$\text{Minimize}\left\{\frac{a}{2}(T_{2,1}^2 - T_{2,L}^2) + b(T_{2,1} - T_{2,L})\right\} \qquad (27)$$

s.t.

$$aT_{2,n} + b \leq \tau_n, n \in \{1, 2, \ldots, L\}$$

Linear programming in two-dimensions can be solved using linear-time algorithms that are extremely efficient.

The analysis above for the Sync message scenario can be extended to Delay_Req message exchanges between slave and master. Here, $\tau_n = T_{4,n} - T_{3,n}$ denotes the transport delay between slave and master. From (12)

$$\varphi_2 T_{3,n} + \beta_2 \leq T_{4,n} - T_{3,n}$$

$$\varphi_2 T_{3,n} + \beta_2 \leq \tau_n \qquad (28)$$

Let $a = \varphi_2$ and $b = \beta_2$. Then (28) is of form $ax+b \leq y$ where $x = T_{3,n}$ and $y = \tau_n$. The line bordering the cloud of points is $ax+b=y$. The unknowns here are $a = \varphi_2$ and $b = \beta_2$. Here, the linear constraint $aT_{3,n} + b \leq \tau_n$ must be satisfied for all n. The objective function (25) can be formulated to solve for $a = \varphi_2$ and $b = \beta_2$.

Knowing $\varphi_1$, $\beta_1$, $\varphi_2$, and $\beta_2$ from the linear programming solution, the skew α can then be determined from (15) and offset θ can be determined from (17) as discussed earlier. Other linear programming approaches for determining the skew and offset are described in [2][3][4][5][6].

Linear Programming Model 2

A second linear programming model for computing offset θ and skew α according to a further embodiment of the present invention will now be described. Retaining α in (9), the following expression for the nth Sync (downstream) message flows becomes $T_{1,n} \leq (1+\alpha)T_{2,n} + \beta_1$ from which the boundary of the cloud of downstream timestamps is $T_{1,n} = (1+\alpha)T_{2,n}\beta_1$. This is of the form $y = (1+\alpha)x + \beta_1$, where $y \in T_{1,n}$, $T_{4,n} \in S(t)$ and $x \in T_{2,n}, T_{3,n} \in C(t)$.

The cloud of downstream timestamps generated as a result of path propagation delay and queuing delays can lie (or spread) below this line but the "true" line relating master and slave clocks must NOT. This means, the line relating the master and slave clocks, must lie ON or ABOVE this boundary (line). This results in the following constraint for the downstream cloud $T_{1,n} \geq (1+\alpha)T_{2,n} + \beta_1$ or $y \geq (1+\alpha)x + \beta_1$.

Similarly, retaining α in (12) gives the following expression for the nth Delay_Req (upstream) message flows as $T_{4,n} \geq (1+\alpha)T_{3,n} + \beta_2$, which also produces the boundary of the cloud of upstream timestamps as $T_{4,n} = (1+\alpha)T_{3,n} + \beta_2$. This is also of the form $y = (1+\alpha)x\beta_2$.

Here too, the cloud of upstream timestamps generated as a result of path propagation delay and queuing delays can lie above this line but the "true" line relating master and slave clocks must NOT. The line relating the master and slave clocks, must lie ON or BELOW this boundary (line). This results in the following constraint for the upstream cloud $T_{4,n} \leq (1+\alpha)T_{3,n} + \beta_2$ which is also of the form $y \leq (1+\alpha)x + \beta_2$.

These two constraints $T_{1,n} \geq (1+\alpha)T_{2,n} + \beta_1$ and $T_{4,n} \leq (1+\alpha)T_{3,n} + \beta_2$ (see FIG. 6) can be interpreted as the constraints of a linear program which suggests a line (dashed line in figure) that separates the downstream cloud of timestamps and upstream cloud of timestamps. The clock offset parameters $\beta_1$ and $\beta_2$ ideally should be the same or extremely close together since they relate to the same clocks (master and slave). We are therefore trying to find the smallest corridor (defined by the constraints $T_{1,n} \geq (1+\alpha)T_{2,n}+\beta_1$ and $T_{4,n} \leq (1+\alpha)T_{3,n}+\beta_2$) that gives us the smallest difference between $\beta_1$ and $\beta_2$.

Figure 6:
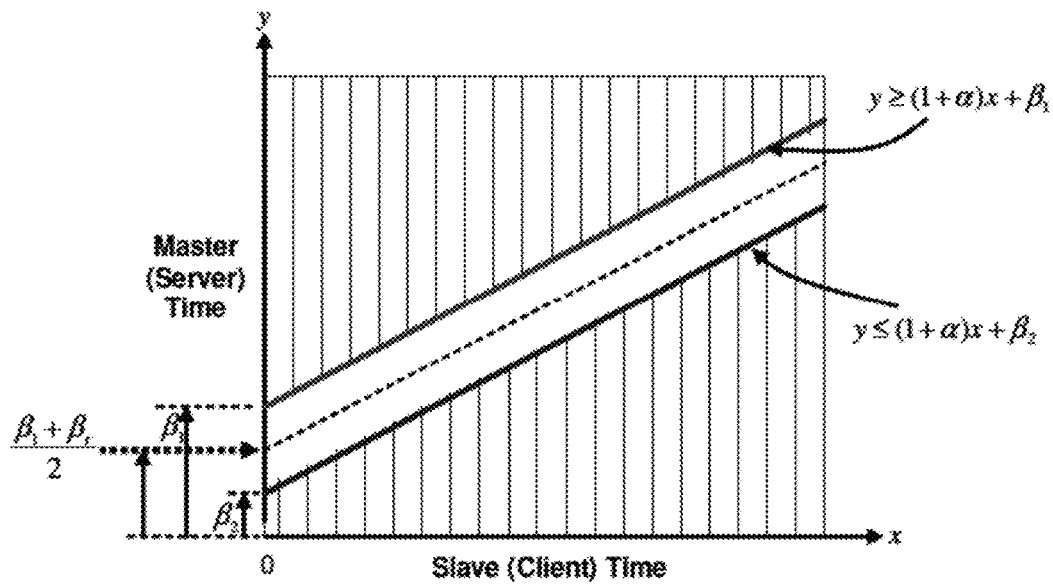
FIG. 6 illustrates the two constraints in a linear programming formulation according to an embodiment of the present invention.

The idea here is to estimate parameters that will make the two parallel lines in FIG. 6 as close together as possible, that is, make the lane between these two lines as small as possible. The estimation algorithm strives to identify the two parallel lines $y=(1+\alpha)x+\beta_1$ (line bordering the downstream cloud) and $y=(1+\alpha)x+\beta_2$ (line bordering upstream cloud) with the condition that $\beta_1-\beta_2$ is minimized but at the same time allow the two lines to fit just at the edge of the two clouds.

A linear programming formulation that seeks to place these two parallel lines as wide apart as possible is as follows.

Minimize $\beta_1-\beta_2$ s.t.

$T_{1,n} \geq (1+\alpha)T_{2,n}+\beta_1$, $n \in \{1,2,\ldots,L\}$, $T_{4,n} \leq (1+\alpha)T_{3,n}+\beta_2$, $n \in \{1,2,\ldots,L\}$, $\beta_1-\beta_2 \geq 0$. (29)

Knowing the skew $\alpha$ and the parameters $\beta_1$ and $\beta_2$ from the above linear program, the offset $\theta$ can be determined from (17) as discussed earlier.

Clock Skew Estimation Using a Timestamp-Driven Digital Phase-Locked Loop

A further embodiment of the present invention provides a method of estimating clock skew based on a timestamp-driven digital phase-locked loop (DPLL) and a free-running counter (that is driven by the destination oscillator) for clock skew estimation which will now be described. A further embodiment of the present invention provides a method of estimating and monitoring how well the DPLL is frequency synchronized to the source frequency. The DPLL frequency synchronization and clock skew estimation in these embodiments is done using only one-way measurements, for example, via PTP Sync and Follow_Up messages—two-way PTP message exchanges are not required (no need for Delay_Req and Delay_Resp messages).

Frequency Synchronization Using a DPLL

Figure 7:
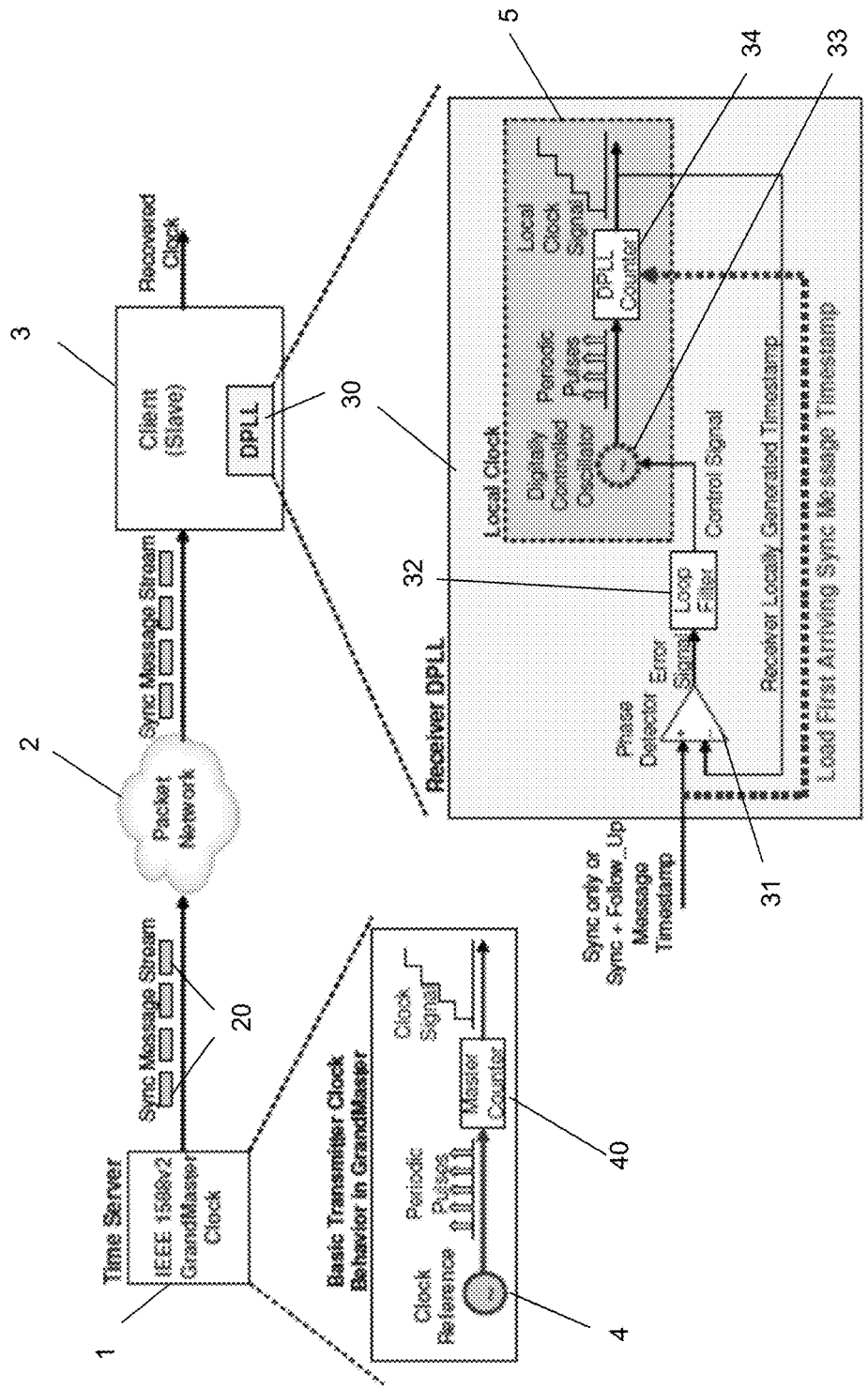
FIG. 7 shows, schematically, the basic transmitter clock and receiver DPLL architecture of a system according to an embodiment of the present invention.

The transmitter (master or PTP GrandMaster) clock conceptually can be viewed as consisting simply of a high accuracy, high performance oscillator 4 and a (master) counter 40 (FIG. 7). The oscillator 4 issues periodic pulses that constitute the input to the master counter 4-. The oscillator frequency is the inverse of the interval between consecutive pulses (oscillator period). The output of the master counter 4- represents the master clock signal and is incremented by a fixed amount at each pulse (e.g., 8 ns increments for a 125 MHz nominal oscillator frequency). Samples of master clock signals are communicated to the receiver (slave) 3 as timestamps 20. The local clock 4 in the master 1 is free running or possibly synchronized to an external source of time such as the Global Positioning System (GPS) or atomic clock.

From the flow of timestamp messages arriving at the receiver 3, the receiver DPLL 30 tunes its internal controlled oscillator 33 such that it produces an output clock signal that is identical to the transmitter clock. To do this, the first arriving timestamp at the receiver is used to initialize the master counter 34 and DPLL control is exercised such that the master counter 34 readings coincide with arriving timestamp values. The timestamps used in determining the arrival instants of timestamp messages are based on timestamps generated from the local clock 5 (FIG. 7). The control loop in the receiver DPLL adjusts the clock 5 to agree with the time of its master 4, that is, to make the rate of the local clock equal to that of the master.

In the frequency synchronization technique according to the present embodiment, each broadcast begins at time $T_1$ with a Sync message sent by the master to all the slave clocks in the domain. A slave clock receiving this message takes note of the local time $T_2$ when this message is received. The master may subsequently send a multicast Follow_Up with accurate $T_1$ timestamp, the reason being not all masters have ability to present an accurate time stamp in the Sync message. It is only after the transmission is complete that they are able to retrieve an accurate time stamp for the Sync transmission from their network hardware. Masters with this limitation use the Follow_Up message to convey $T_1$ (two-step clock). Masters with PTP capabilities built into their network hardware are able to present an accurate time stamp in the Sync message and do not need to send Follow_Up messages, these are called one-step clocks.

Figure 8:
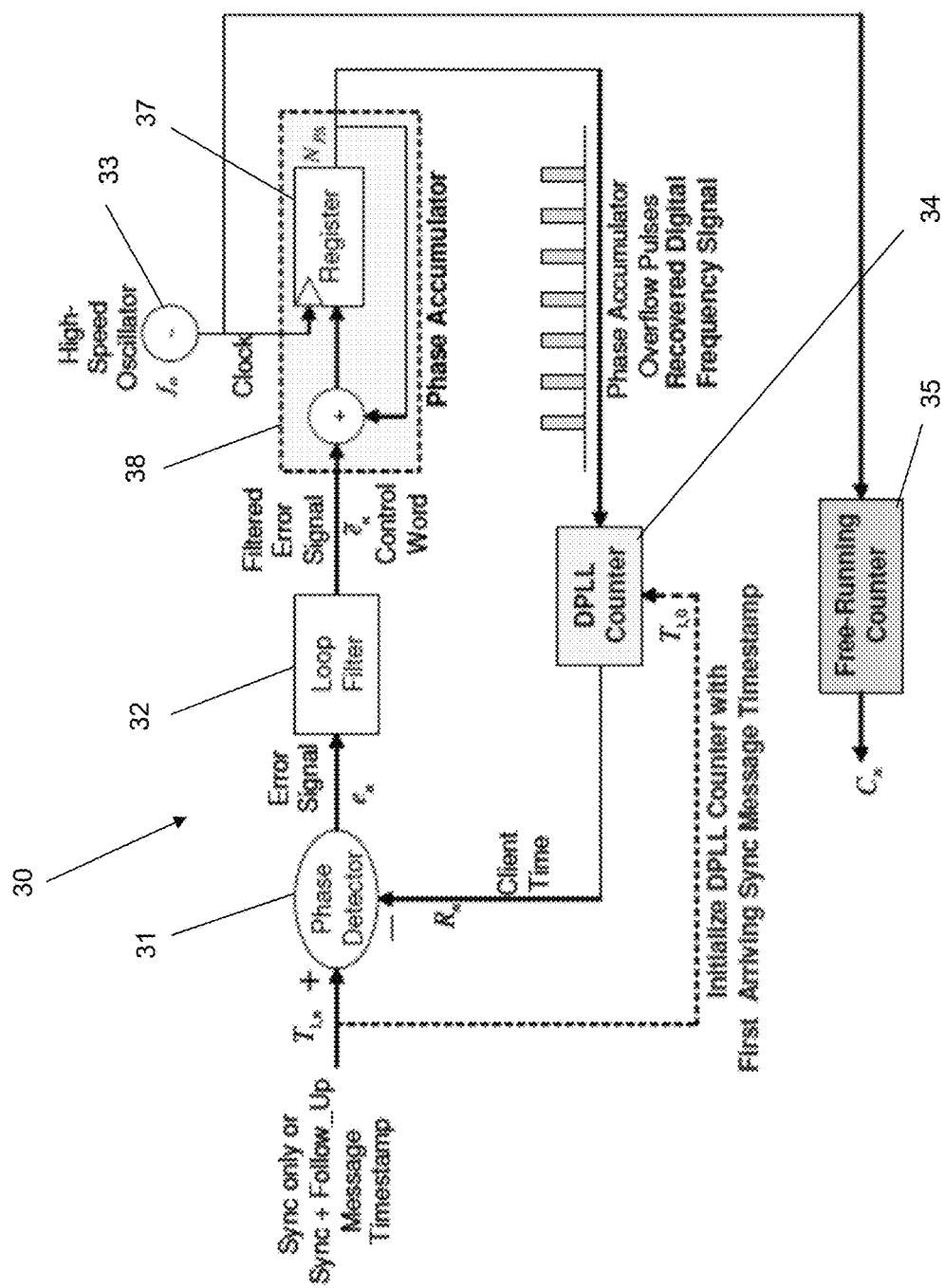
FIG. 8 shows, schematically, the operation of a DPLL based on a phase accumulator-type digitally controlled oscillator.

The controlled oscillator 33 within the DPLL 30 as shown in FIG. 7 and FIG. 8 produces a periodic pulse signal which drives a local DPLL counter 34 whose output enters the phase detector 31. Here the phase of the signals from the DPLL counter 34 and the incoming reference signal in the form of timestamps 20 are compared and a resulting difference or error signal is produced. This error corresponds to the phase difference between the two signals, transmitter and receiver clocks.

The error signal from the phase detector 31 in the DPLL 30 passes through a low pass filter 32 (loop filter) which governs many of the properties of the loop and removes any high frequency elements on the signal. Once through the filter 32 the error signal is applied to the control terminal of the controlled oscillator 33 as its control or tuning signal. The nature of this control signal is such that it tries to reduce the phase difference and hence the frequency between the two signals. Initially the loop will be out of lock, and the filtered error signal will pull the frequency of the controlled oscillator towards that of the reference, until it cannot reduce the error any further and the loop is locked.

This frequency synchronization strategy allows multiple slaves, for example in a broadcast or point-to-multipoint communication scenario, to synchronize their clocks to the master. The one-step clock and two-step clock algorithms used by the slave DPLL to synchronize its frequency to the master's are described in a previous patent of the inventors' [8].

Let $S_n=T_{1,n}$ denote the timeline (e.g., in clock increments of say 8ns for a 125 MHz clock) of the transmitter and $R_n=T_{2,n}$ the timeline of the receiver. These two functions correspond to the timestamps of the two clocks at discrete time instants n, n=0,1,2,.... We assume that the timelines $S_n=T_{1,n}$ and $R_n=T_{2,n}$ are discrete time samples of the master (server) clock S(t) and the tunable (synchronized) slave clock R(t), respectively. The state of the free-running counter 35 is denoted in discrete time and continuous time, respectively, by $C_n$ and C(t).

In the DPLL 30, only when the phase between the two signals (that is the difference between transmitter timestamp $S_n=T_{1,n}$ and receiver timestamp $R_n=T_{2,n}$) is changing is there a frequency difference. The phase difference decreases towards zero when the loop is in lock, which means that the frequency of the DPLL internal controlled oscillator 33 is exactly the same as the reference frequency.

The DPLL employs a phase accumulator 37, a loop filter 32, a phase detector 31, and a counter 34 as shown in FIG. 8. In the method of this embodiment, at each phase accumulator overflow (output) pulse, the DPLL counter 34 is incremented by the nominal period of the phase accumulator overflow pulse (e.g., 8 ns for a 125 MHz nominal phase accumulator overflow output frequency). The DPLL 30 is controlled in such a way that the DPLL counter evolution follows the server counter as illustrated in FIG. 7.

Figure 9:
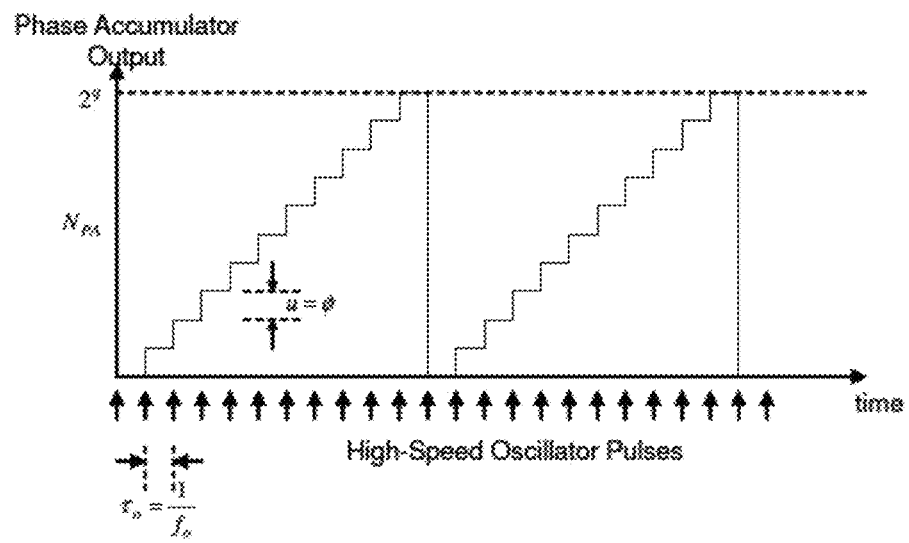
FIG. 9 shows the progression of the output of the phase accumulator shown in FIG. 8.

The phase accumulator 37 is a variable-modulus counter that increments the number stored in it each time it receives a clock pulse. When the counter overflows it wraps around, making the phase accumulator's output contiguous as shown in FIG. 9. The larger the added increment $\phi$, the faster the accumulator overflows, which results in a higher output frequency. The output frequency $f_{ACC}$ of the phase accumulator is a function of the system clock frequency $f_o$, the number of bits q in the phase accumulator and the phase increment value $\phi$. The phase increment $\phi$ is an unsigned value.

$$f_{ACC} = \frac{f_o}{2^q} \phi \qquad (30)$$

From this equation it can be seen that the frequency resolution of the phase accumulator is $f_{res}=f_o/2^q$. The phase accumulator is operating with a control input $\phi_{nom}$ which corresponds to the nominal frequency $f_{ACC}=f_{nom}$. It can be seen from the above discussion that adding a quantity $-\phi_{corr}$ to $\phi_{nom}$ (i.e. $\phi_{ACC}=\phi_{nom}-\phi_{corr}$) results in a decrease in the output frequency, $f_{ACC}=f_{nom}-\Delta f$, whereas adding a quantity $+\phi_{corr}$ to $\phi_{nom}$ (i.e., $\phi_{ACC}=\phi_{nom}+\phi_{corr}$) results in an increase in the output frequency, $f_{ACC}=f_{nom}+\Delta f$. Thus, by appropriately controlling the quantity $\phi_{corr}$ added to $\phi_{nom}$, the output frequency of the phase accumulator $f_{ACC}$ can be controlled accordingly.

For example, at startup in a system operating in the one-step clock mode, the DPLL 30 waits for the first arriving Sync message timestamp ($T_{1,0}$). This first server timestamp is used to initialize the DPLL counter 34 ($R_0=T_{1,0}$). From this point onwards and upon the receipt of subsequent Sync message timestamps ($T_{1,n}$) at any discrete time instant n, the DPLL 30 starts to operate in a closed-loop fashion. At each Sync message timestamp arrival ($T_{1,n}$), the DPLL counter 34 reading is noted by the slave ($R_n$). Then the difference between the arriving server timestamp) ($T_{1,n}$) and the DPLL counter reading ($R_n$) gives an error signal ($e_n=T_{1,n}-R_n$). This error signal ($e_n$) is sent to the loop filter 32 whose output controls the frequency of the phase accumulator 37. The output (overflow pulses) of the phase accumulator 37 in turn provides the clock frequency of the slave and also drives the DPLL counter 34. After a while the error term is expected to converge to zero which means the DPLL 30 has been locked to the incoming master timeline.

The control models for the phase detector 31, and digitally controlled oscillator, and given some general structure of the loop filter 32, the DPLL 30 as a whole are described in [8]. The analysis in [8] provides design procedures for determining the parameters of the loop filter 32 that will meet certain pre-specified design and performance requirements.

Clock Skew Estimation using a DPLL

Next a technique, according to an embodiment of the present invention, for estimating the skew of the free-running local oscillator using the DPLL 30 and free-running counter 35 described above will be set out. The clock skew ($\alpha$) is estimated by the client 3 after each Sync message broadcast by the server 1 or after multiple periods of the Sync message broadcast. The period between Sync messages could serve as sampling period of the system. FIG. 8 shows the main blocks of the proposed synchronization and skew estimation mechanism at the time client 3. A free running local oscillator 33 and counter 35 are used together with the DPLL 30 to estimate the skew of the local free-running (high-speed) oscillator.

Skew Estimation

If the DPLL 30 locks onto the master 1 and achieves accurate frequency synchronization (a technique for accuracy analysis described further below), then we can assume that $\Delta R_n = \Delta S_n$, meaning the master timeline and the DPLL counter 34 evolve at the same rate.

If $A_{cc}$ denotes the level of frequency synchronization accuracy in parts-per million (ppm) or parts-per billion (ppb), then $A_{cc}=0$ implies perfect (ideal) frequency synchronization and a positive $A_{cc}$ as the DPLL 30 (specifically the DPLL counter 34) running faster than the master by $A_{cc}$. The underlying idea is to make the slope of the slave DPLL timeline $R_n$ equal to that of the master timeline $S_n$.

Equation (1) above can be written in discrete time as $$S_n=(1+\alpha)C_n+\theta \qquad (31)$$

From this $$\Delta S_n=(1+\alpha)\Delta C_n, \qquad (32)$$

where $\Delta S_n=S_n-S_{n-1}=T_{1,n}-T_{1,n-1}$ and $\Delta C_n=C_n-C_{n-1}$. If accurate frequency synchronization is achieved, then the evolution of $R_n$ becomes a local (slave) copy of the evolution of the master clock $S_n$, that is, $\Delta R_n=\Delta S_n$. Under this condition, $$\Delta R_n=(1+\alpha)\Delta C_n \qquad (33)$$

With this, if incremental changes of both the DPLL counter $\Delta R_n$ and the free-running counter $\Delta C_n$ are taken at a given time instant, then a one-time estimate of the clock skew can be obtained as $$\alpha = \frac{\Delta R_n}{\Delta C_n} - 1 \qquad (34)$$

It is assumed that the two counters are sampled at the same time instant. The sample skew values obtained from the above can be filtered to obtain an estimate of the skew between master clock and slave clock. From (34), it can be inferred that $$\Delta C_n=\Delta R_n \Rightarrow \alpha=0$$

$$\Delta C_n>\Delta R_n \Rightarrow \alpha<0 \text{ (free-running counter is faster)}$$

$$\Delta C_n<\Delta R_n \Rightarrow \alpha>0 \text{ (free-running counter is slower)} \qquad (35)$$

The relationships in (35) are already depicted in FIG. 3.

Accuracy Analysis

As discussed above, $A_{cc}$ denotes the level of frequency synchronization accuracy in ppm or ppb, that is, accuracy of evolution of $R_n$ with respect to $S_n$. $A_{free}$ is used to denote the accuracy of the evolution of the free-running clock $C_n$ with respect to the master $S_n$. For telecommunication applications, $A_{free}$ is typically in ppm, e.g., 4.6 ppm for a Stratum 3 clock and 32 ppm for a Stratum 4 clock. For mobile applications, for example, A at the air interface should be no more than 50 ppb and 16 ppb at the incoming synchronization interface.

Using (34) and given an ideal reference interval $\Delta t$, a specified $A_{cc}$ and $A_{free}$, it follows that $$\alpha = \frac{(1 \pm A_{cc})\Delta t}{(1 \pm A_{free})\Delta t} - 1 = \frac{(1 \pm A_{cc})}{(1 \pm A_{free})} - 1 \quad (36)$$

Taking for example, $A_{cc}=+16$ ppb (i.e., the DPLL counter running faster by 16 ppb and counts in excess over $\Delta t$), and $A_{free}=+4$ ppm (the free-running clock running faster by 4 ppm and counts in excess over $\Delta t$), gives $$\alpha = \frac{1 + 16 \times 10^{-9}}{(1 + 4 \times 10^{-6})} - 1 =$$

$$\frac{(1 + 0.000000016)}{(1 + 0.000004)} - 1 \approx -3.98398 \times 10^{-6} \approx -4 \; ppm,$$

as expected. Note that by the above definition of $\alpha$ and equation (1), $\alpha<0$ implies the slave free-running counter $C_n$ (reference 35) is faster than the master clock $S_n$ (see FIG. 3). For $A_{cc}=+50$ ppb, $\alpha \approx -3.94998 \times 10^{-6}$, and for $A_{cc}=+100$ ppb, $\alpha 26 -3.89998 \times 10^{-6}$. For a perfect frequency lock, $A_{cc}=0$ ppb, which means $$\alpha = \frac{1}{(1 \pm A_{free})} - 1 = \frac{\mp A_{free}}{(1 \pm A_{free})} \quad (37)$$

But given that for telecom applications $A_{free}$ is typically a very small quantity (in ppm), it can safely be assumed that $\alpha \approx \mp A_{free}$ under these conditions.

Real-Time Estimation and Monitoring of DPLL Frequency Synchronization Accuracy

Next a technique for estimating the frequency synchronization accuracy $A_{cc}$ in real-time according to an embodiment of the present invention will be described. This technique can also be used to monitor the tracking efficiency of the frequency synchronization scheme, i.e., the DPLL in real-time. First, it is assumed that some level of frequency synchronization accuracy $A_{cc}$ is achieved by the DPLL 30. Next the relationship between the synchronized clock (i.e., DPLL counter) R(t) and the master clock S(t) is modeled by $$S(t)=(1+A_{cc})R(t)+\theta_{cc}, \quad (38)$$

where $\theta_{cc}$ is a clock offset. In discrete time, this can be expressed as $$S_n=(1+A_{cc})R_n+\theta_{cc} \quad (39)$$

From this $$\Delta S_n=(1+A_{cc})\Delta R_n, \quad (40)$$

where $\Delta R_n=R_n-R_{n-1}$. If the $T_{1,n}$ timestamps are sent at fixed intervals $\Delta T$ (as is allowed in PTP), then $\Delta S_n=T_{1,n}-T_{1,n-1}=\Delta T$. Summing over N samples, gives $$N\Delta T = (1 + A_{cc})\sum_{i=0}^{N-1} \Delta R_{n-i}, \quad (41)$$

from which $$A_{cc} = \frac{N\Delta T}{\sum_{i=0}^{N-1} \Delta R_{n-i}} - 1 = \frac{\Delta T}{\overline{\Delta R_n}} - 1, \quad (42)$$

where $$\overline{\Delta R_n} = \sum_{i=0}^{N-1} \Delta R_{n-i}/N$$

is the average of the $\Delta R_n$ samples. $\overline{\Delta R_n}$ can be estimated by several methods one of which is the well-known exponentially weighted moving average (EWMA) technique which can be expressed as $$\overline{\Delta R_n}=(1-\gamma)\overline{\Delta R_{n-1}}+\gamma \Delta R_n, \quad (43)$$

where $0<\gamma<1$ is a filtering parameter. This simple technique allows $A_{cc}$ to be estimated continuously and efficiently in real-time.

Estimating the Clock Offset Given a Known or Estimated Skew

If the clock skew is known, then using the estimation described above or any other technique, the linear programming techniques can be formulated as follows:

Linear Programming Model 1:
  Minimize $\{b(T_{2,1}-T_{2,L})\}$
  s.t.
  $$b \leq \tau_n - aT_{2,n}, \; n \in \{1,2,\ldots,L\} \quad (44)$$

Here $a=-\varphi_1=-\alpha$ for Sync messages (or $a=\varphi_2=\alpha$ for Delay_Req) are known or estimated while the corresponding $b=-\beta_1$ (or $b=\beta_2$) are unknown.

Linear Programming Model 2:
  Minimize $\beta_1-\beta_2$
  s.t.
  $$\beta_1 \leq T_{1,n}-(1+\alpha)T_{2,n}, \; n \in \{1,2,\ldots,L\},$$
  $$\beta_2 \geq T_{4,n}-(1+\alpha)T_{3,n}, \; n \in \{1,2,\ldots,L\},$$
  $$\beta_1-\beta_2 \geq 0. \quad (45)$$

In this model, $\alpha$ is the known or estimated skew while $\beta_1$ and $\beta_2$ are unknown.

Furthermore, when frequency synchronization is achieved using a technique such as Synchronous Ethernet (Sync-E), Network Timing Reference (NTR) or similar techniques, then $\alpha \approx 0$. With this the linear programming models can be formulated as follows:

Linear Programming Model 1:
  Minimize $\{b(T_{2,1}-T_{2,L})\}$
  s.t.
  $$b \leq \tau_n, \; n \in \{1,2,\ldots,L\}, \quad (46)$$

Linear Programming Model 2:
  Minimize $\beta_1-\beta_2$
  s.t.
  $$\beta_1 \leq T_{1,n}-T_{2,n}, \; n \in \{1,2,\ldots,L\},$$
  $$\beta_2 \geq T_{4,n}-T_{3,n}, \; n \in \{1,2,\ldots,L\},$$
  $$\beta_1-\beta_2 \geq 0. \quad (47)$$

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

References

[1]. *IEEE Standard for a Precision Clock Synchronization Protocol for Networked Measurement and Control Systems*, IEEE 1588-2008.
[2]. S. B. Moon, P. Skelly and D. Towsley, "Estimation and removal of clock skew from network delay measurements," in Proc. *IEEE INFOCOM*, vol. 1, pp. 227-234, New York, N.Y., USA, Mar. 1999.
[3]. P. Skelly, S. B. Moon, D. Towsley, Verizon Laboratories Inc. (2003), Clock skew estimation and removal, U.S. Pat. 6,661,810.
[4]. L. Zhang, Z. Liu and C. H. Xia, "Clock synchronization algorithms for network measurements," in Proc. *IEEE INFOCOM*, vol. 1, pp. 160-169, Nov. 2002.
[5]. Z. Liu, C. H. Xia, L. Zhang, International Business Machines Corporation (2005), Clock synchronization with removal of clock skews through network measurements in derivation of a convex hull, U.S. Pat. No. 6,957,357.
[6]. A. Bletsas, "Evaluation of Kalman filtering for network time keeping," *IEEE Transactions on Ultrasonics, Ferroelectrics and Frequency Control*, vol. 52, no. 9, pp. 1452-1460, Sept. 2005.
[7]. *ITU-T Recommendation G.8271/Y.1366*, Time and Phase Synchronization Aspects of Packet Networks, Feb. 2012.
[8]. James Aweya and Saleh Al-Araji, Method and System for Frequency Synchronization, U.S. Pat. No. 8,913,632.

All references referred to above are hereby incorporated by reference.

The invention claimed is:

1. A slave device connected to a master device having a master clock over a network, wherein the slave device includes a slave clock and a processor, and wherein the processor is arranged to:
exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock;
formulate a linear programming problem which includes in its constraints said timestamps along with variables relating to: the skew and offset of the slave clock compared to the master clock; and the relationship between the forward and reverse transmission speeds in the network between the master device and the slave device;
solve the linear programming problem to derive an estimate of the skew and offset of the slave clock relative to the master clock; and
synchronize the slave clock to the master clock based on the estimated skew and offset to produce a master time estimate.

2. The slave device according to claim 1 wherein the linear programming problem comprises two problems, in which:
the first problem seeks to minimize the expression $$\frac{a}{2}(T_{2,1}^2 - T_{2,L}^2) + b_1(T_{2,1} - T_{2,L})$$

subject to the constraint that $aT_{2,n}+b_1 \leq \tau_n$, $n \in \{1, 2, \ldots, L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n = T_{2,n} - T_{1,n}$ is the transport delay between the master and the slave with $T_{1,n}$ being the time of sending of the nth timing message from the master device according to the master clock, and
the second problem seeks to minimize the expression $$\frac{a}{2}(T_{4,1}^2 - T_{4,L}^2) + b_2(T_{4,1} - T_{4,L})$$

subject to the constraint that $aT_{4,n}+b \leq \tau_n$, $n \in \{1, 2, \ldots, L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau_n=T_{4,n}-T_{3,n}$ is the transport delay between the master and the slave with $T_{3,n}$ being the time of sending of the nth timing message from the slave device according to the slave clock.

3. The slave device according to claim 2 wherein $b_1=-\theta+t_{ds}+p_{ds}$ and $b_2=-\theta-\xi t_{ds}-p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

4. The slave device according to claim 1 wherein the linear programming problem seeks to minimize the expression $\beta_1-\beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n}\geq(1+\alpha)T_{2,n}+\beta_1$, $T_{4,n}\leq(1+\alpha)T_{3,n}+\beta_2$ and $\beta_1-\beta_2\geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

5. The slave device according to claim 4 wherein $\beta_1=\theta-t_{ds}-p_{ds}$ and $\beta_2=\theta+\xi t_{ds}+p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

6. The slave device according to claim 1 wherein the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

7. The slave device according to claim 6 wherein the skew-adjusted free-running counter is also used to provide timestamps for the time of receipt of timing messages at the slave device and the time of sending of timing messages from the slave device.

8. The slave device according to claim 7 wherein the counter is initialized on receipt by the slave device of the first timing message from the master device, and the counter is reset on receipt of the first master time estimate to said first master time estimate.

9. A method of synchronizing the time and frequency of a slave clock in a slave device to a master clock in a master device which is connected to the slave device over a network, the method including the steps of:

exchanging, between the master device and the slave device, timing messages and recording timestamps which are: the time of sending of timing messages from the master device according to the master clock; the time of receipt of said timing messages according to the slave clock; the time of sending of said timing messages according to the slave clock; and the time of receipt of said timing messages according to the master clock;

formulating a linear programming problem which includes in its constraints said timestamps along with variables relating to: the skew and offset of the slave clock compared to the master clock; and the relationship between the forward and reverse transmission speeds in the network between the master device and the slave device;

solving the linear programming problem to derive an estimate of the skew and offset of the slave clock relative to the master clock; and synchronizing the slave clock to the master clock based on the estimated skew and offset to produce a master time estimate.

10. The method according to claim 9 wherein the linear programming problem comprises two problems, in which:

the first problem seeks to minimize the expression $$\frac{a}{2}(T_{2,1}^2 - T_{2,L}^2) + b_1(T_{2,1} - T_{2,L})$$

subject to the constraint that $aT_{2,n}+b_1\leq\tau_n$, $n\in\{1, 2, \ldots, L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n=T_{2,n}-T_{1,n}$ is the transport delay between the master and the slave with $T_{1,n}$ being the time of sending of the nth timing message from the master device according to the master clock, and the second problem seeks to minimize the expression $$\frac{a}{2}(T_{4,1}^2 - T_{4,L}^2) + b_2(T_{4,1} - T_{4,L})$$

subject to the constraint that $aT_{4,n}+b\leq\tau_n$, $n\in\{1, 2, \ldots, L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau T_n=T_{4,n}-T_{3,n}$ is the transport delay between the master and the slave with $T_{3,n}$ being the time of sending of the nth timing message from the slave device according to the slave clock.

11. The method according to claim 10 wherein $b_1=-\theta+t_{ds}+p_{ds}$ and $b_2=-\theta-\xi t_{ds}-p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

12. The method according to claim 9 wherein the linear programming problem seeks to minimize the expression $\beta_1-\beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n} \geq (1+\alpha)T_{2,n}+\beta_1$, $T_{4,n} \leq (1+\alpha)T_{3,n}+\beta_2$ and $\beta_1-\beta_2 \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

13. The method according to claim 12 wherein $\beta_1=\theta-t_{ds}-p_{ds}$ and $\beta_2=\theta\xi t_{ds}+p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

14. The method according to claim 9 wherein the slave clock includes a local free-running oscillator and a skew-adjusted free-running counter driven by the output of said local free-running oscillator, and the step of synchronizing includes the steps of:
synchronizing the frequency of the slave clock to the frequency of the master clock by adjusting the skew-adjusted free-running counter to take account of the estimated skew and
applying the estimated offset to the output of the skew-adjusted free-running counter to produce the master time estimate.

15. The method according to claim 14 wherein the skew-adjusted free-running counter is also used to provide timestamps for the time of receipt of timing messages at the slave device and the time of sending of timing messages from the slave device.

16. The method according to claim 15 further including the steps of:
initializing the counter on receipt by the slave device of the first timing message from the master device, and
resetting the counter to said first master time estimate on receipt of the first master time estimate.

17. A time and frequency synchronisation system for a network, the system including:
a master device having a master clock;
a slave device having a slave clock; and
a network connecting the master and slave devices,
wherein:
the slave clock comprises a slave clock and a processor; and
the processor is arranged to:
exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock;
formulate a linear programming problem which includes in its constraints said timestamps along with variables relating to: the skew and offset of the slave clock compared to the master clock; and the relationship between the forward and reverse transmission speeds in the network between the master device and the slave device;
solve the linear programming problem to derive an estimate of the skew and offset of the slave clock relative to the master clock; and
synchronize the slave clock to the master clock based on the estimated skew and offset to produce a master time estimate.

18. The system according to claim 17 wherein the linear programming problem comprises two problems, in which:
the first problem seeks to minimize the expression $$\frac{a}{2}(T_{2,1}^2 - T_{2,L}^2) + b_1(T_{2,1} - T_{2,L})$$

subject to the constraint that $aT_{2,n}+b_1 \leq \tau_n$, $n \in \{1, 2, \ldots, L\}$ wherein a is the negative of the skew of the slave clock relative to the master clock, $T_{2,n}$ is the time of receipt of the nth timing message from the master device according to the slave clock, $b_1$ is the negative of the offset of the slave clock compared to the master clock as adjusted by the transmission delay and the physical link delay in the downstream direction from master to slave and $\tau_n=T_{2,n}-T_{1,n}$ is the transport delay between the master and the slave with $T_{1,n}$ being the time of sending of the nth timing message from the master device according to the master clock, and
the second problem seeks to minimize the expression $$\frac{a}{2}(T_{4,1}^2 - T_{4,L}^2) + b_2(T_{4,1} - T_{4,L})$$

subject to the constraint that $aT_{4,n}+b \leq \tau_n$, $n \in \{1, 2, \ldots, L\}$ wherein a is the negative of the skew of the slave clock relative to the master clock, $T_{4,n}$ is the time of receipt of the nth timing message from the slave device according to the master clock, $b_2$ is the negative of the offset as adjusted by the transmission delay and the physical link delay in the upstream direction from slave to master and $\tau_n=T_{4,n}-T_{3,n}$ is the transport delay between the master and the slave with $T_{3,n}$ being the time of sending of the nth timing message from the slave device according to the slave clock.

19. The system according to claim 18 wherein $b_1=-\theta+t_{ds}+p_{ds}$ and $b_2=-\theta-\xi t_{ds}-p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

20. The system according to claim 17 wherein the linear programming problem seeks to minimize the expression $\beta_1-\beta_2$ in which $\beta_1$ is the offset of the slave clock compared to the master clock as adjusted by the transmission delay and the physical link delay in the downstream direction from master to slave and $\beta_2$ is the offset as adjusted by the transmission delay and the physical link delay in the upstream direction from slave to master, subject to the constraints that $T_{1,n} \geq (1+\alpha)T_{2,n}+\beta_1$, $T_{4,n} \leq (1+\alpha)T_{3,n}+\beta_2$ and $\beta_1-\beta_2 \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock.

21. The system according to claim 20 wherein $\beta_1=\theta-t_{ds}-p_{ds}$ and $\beta_2=\theta+\xi t_{ds}+p_{us}$ wherein $\theta$ is the offset of the slave clock compared to the master clock, $t_{ds}$ is the transmission delay in the downstream direction, $p_{ds}$ is the physical link delay in the downstream direction, $p_{us}$ is the physical link delay in the upstream direction and $\xi$ is the speed ratio of the transmission rate in the downstream direction to the transmission rate in the upstream direction.

22. The system according to claim 17 wherein the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

23. The system according to claim 22 wherein the skew-adjusted free-running counter is also used to provide timestamps for the time of receipt of timing messages at the slave device and the time of sending of timing messages from the slave device.

24. The system according to claim 23 wherein the counter is initialized on receipt by the slave device of the first timing message from the master device, and the counter is reset on receipt of the first master time estimate to said first master time estimate.

* * * * *